United States Patent
Heinz

(10) Patent No.: US 6,186,534 B1
(45) Date of Patent: Feb. 13, 2001

(54) AIR BAG IMPACT PROTECTION ARRANGEMENT AND PROCESS FOR FOLDING AN AIR BAG

(75) Inventor: Martin Heinz, Stuttgart (DE)

(73) Assignee: Dr. Ing. h.c. F. Porsche AG, Weissach (DE)

( * ) Notice: Under 35 U.S.C. 154(b), the term of this patent shall be extended for 0 days.

(21) Appl. No.: 09/123,351

(22) Filed: Jul. 28, 1998

(30) Foreign Application Priority Data

Aug. 20, 1997 (DE) .............................................. 197 36 065

(51) Int. Cl.$^7$ ..................................................... B60R 21/16
(52) U.S. Cl. ..................... 280/728.2; 280/743.1; 280/732
(58) Field of Search ............................. 280/743.1, 728.1, 280/728.2, 730.2, 731, 732

(56) References Cited

U.S. PATENT DOCUMENTS

| 4,944,527 | 7/1990 | Bishop et al. . |
|---|---|---|
| 5,240,282 | 8/1993 | Wehner et al. . |
| 5,348,341 | * 9/1994 | Webber ............................... 280/728 |
| 5,498,023 | 3/1996 | Adams et al. . |
| 5,498,030 | 3/1996 | Hill et al. . |
| 5,730,463 | * 3/1998 | Fisher et al. ....................... 280/743.1 |
| 5,899,490 | * 5/1999 | Wipasuramonoton et al. .. 280/730.2 |

FOREIGN PATENT DOCUMENTS

| 0712763 | 5/1996 | (EP) . |
|---|---|---|
| 97/14586 | 4/1997 | (WO) . |
| 97/21564 | 6/1997 | (WO) . |

* cited by examiner

Primary Examiner—Lanna Mai
Assistant Examiner—Kevin McKinley
(74) Attorney, Agent, or Firm—Evenson, McKeown, Edwards & Lenahan, P.L.L.C.

(57) ABSTRACT

An air bag impact protection arrangement for vehicle occupants includes a trough-shaped housing in which an inflating device and the folded-together air bag are housed. The inflating device is formed by an elongated tube generator. The air bag is placed into a narrow elongated storage shape by bringing the air bag into its folded-together position by combined turning and rolling foldings. In its folded-together position, the air bag is held by a surrounding protective cover envelope.

1 Claim, 6 Drawing Sheets

AIR BAG IMPACT PROTECTION ARRANGEMENT AND PROCESS FOR FOLDING AN AIR BAG

This application claims the priority of Application No. 197 36 065.3, filed in Germany on Aug. 20, 1997, the disclosure of which is expressly incorporated by reference herein.

BACKGROUND AND SUMMARY OF THE INVENTION

This invention relates to an air bag impact protection arrangement and to a process for folding an air bag.

Air bags are used as impact protection devices in vehicles. In an inoperative condition, an air bag is stored, together with an inflating device such as a gas generator, in a trough-shaped housing which is used, for example, with a driver air bag, a front passenger air bag or a side air bag.

It is known from German Patent Document DE 25 36 933 A1 to first fold an approximately circular air bag to a run and then fold the ends of the run to such an extent that a square is formed. By diagonally folding-in the corners, this square can then be further folded together in a square shape. In such a folding operation, the first formed basic square shape will always be maintained during further folding. In this arrangement, the housing has an approximately square construction, and the inflating device provided outside the air bag is connected to a housing inlet opening on the rearward surface of the air bag.

It is an object of the invention to provide an air bag impact protection arrangement and a process for folding an air bag by which the storage shape of the air bag is adapted to a trough-shaped housing.

According to the invention, this object and other objects are achieved by bringing an air bag into its folded-together position by combined turning and rolling foldings and by holding the air bag in position by a surrounding protective cover envelope.

The principal advantages achieved by the invention are that the air bag can be brought into an elongated narrow storage shape by combined turning and rolling foldings such that, in its storage form, the air bag is held in position by a protective covering envelope which surrounds it.

By a combination of turning and rolling folds, a particularly space-saving folded package is achieved so that the housing for storing the air bag also requires little installation space. The rolling folding creates a rolled package which, in the folded position, extends directly above the tube generator and is aligned parallel to it. In addition, a flat spreading-out is achieved during inflation of the air bag.

An embodiment of the invention is illustrated in the drawings and in the following will be described in detail.

DESCRIPTION OF THE PREFERRED EMBODIMENTS

Figure 3:
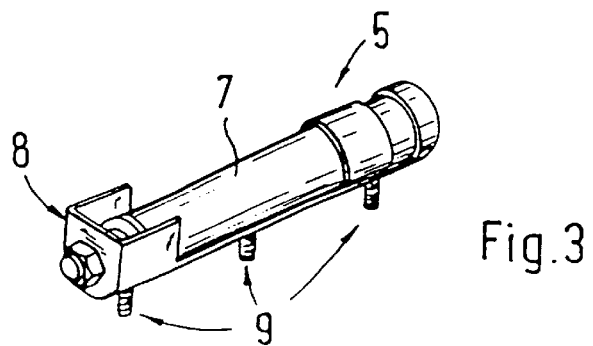
FIG. 3 is a perspective view of the tube generator held in position by a generator support.

An air bag impact protection arrangement 1 for an occupant 2 of a vehicle comprises a prefabricated assembly module 3 which is composed of a trough-shaped housing 4, an inflating device 5 and an air bag 6. In the embodiment, the inflating device 5 is formed by an elongated tube generator 7 which is fastened on a generator support 8 (FIG. 3). The tube generator 7 and the generator support 8 form a preassembled constructional unit which, before the folding operation of the air bag 6, is completely inserted into the interior of the air bag 6 and is connected with it. However, the tube generator 7 may also be arranged completely outside the air bag 6 or may partially protrude into the air bag 6.

Figure 1:
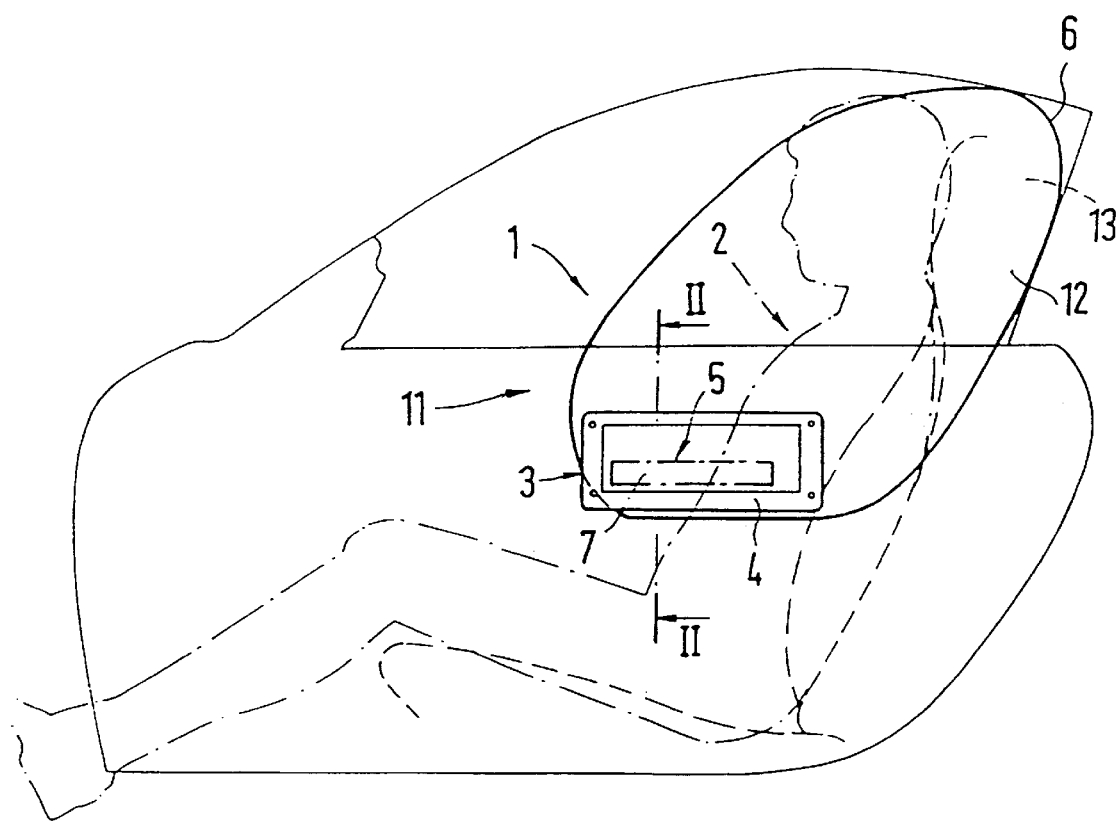
FIG. 1 is a partial lateral view of an air bag impact protection arrangement for an occupant of a vehicle and showing the air bag in an inflated operative position.
Figure 2:
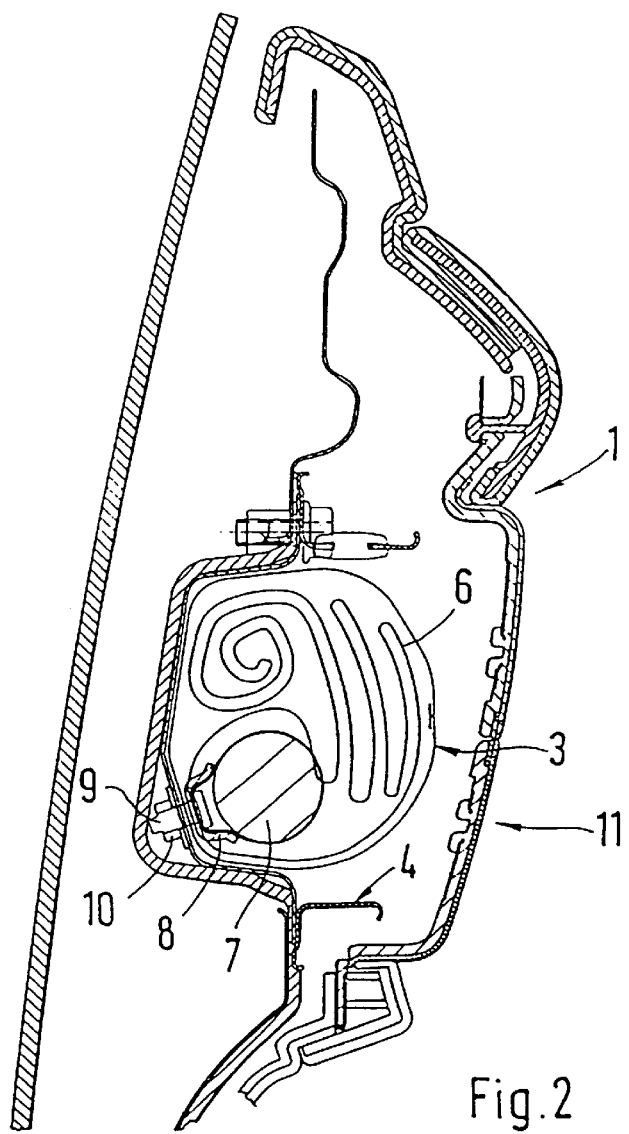
FIG. 2 is an enlarged sectional view along line II—II of FIG. 1 and illustrating the air bag in its folded-together position.

Several projecting fastening bolts 9 which are arranged in a spaced manner and have an external thread are provided on the generator support 8. The fastening bolts 9 are fitted through corresponding bores of the air bag 6 as well as through openings of the housing 4. Nuts 10 (FIG. 2) are screwed from the exterior side onto the projecting free ends of the fastening bolts 9. The preassembled assembly module 3 is assigned to a side impact protection device 11. However, the assembly module 3 may also be assigned to a front passenger air bag or to a driver air bag.

The air bag 6, which has a relatively large volume (volume approximately 30 liters) for a side impact protection device 11, is composed of two approximately equally large woven fabric layers 12, 13 which are arranged above one another and which are connected with one another on the edge side by one or several surrounding seams. The woven fabric layer, which faces the vehicle occupant 2 in the inflated condition, is provided with reference number 12, whereas, on the woven fabric layer 13 which faces away from the vehicle occupant 2, an inserting opening is provided, which is not shown in detail, for inserting the tube generator 7 and the generator support 8. The fastening of the generator support 8 takes place on the woven fabric layer 13.

Figure 4:
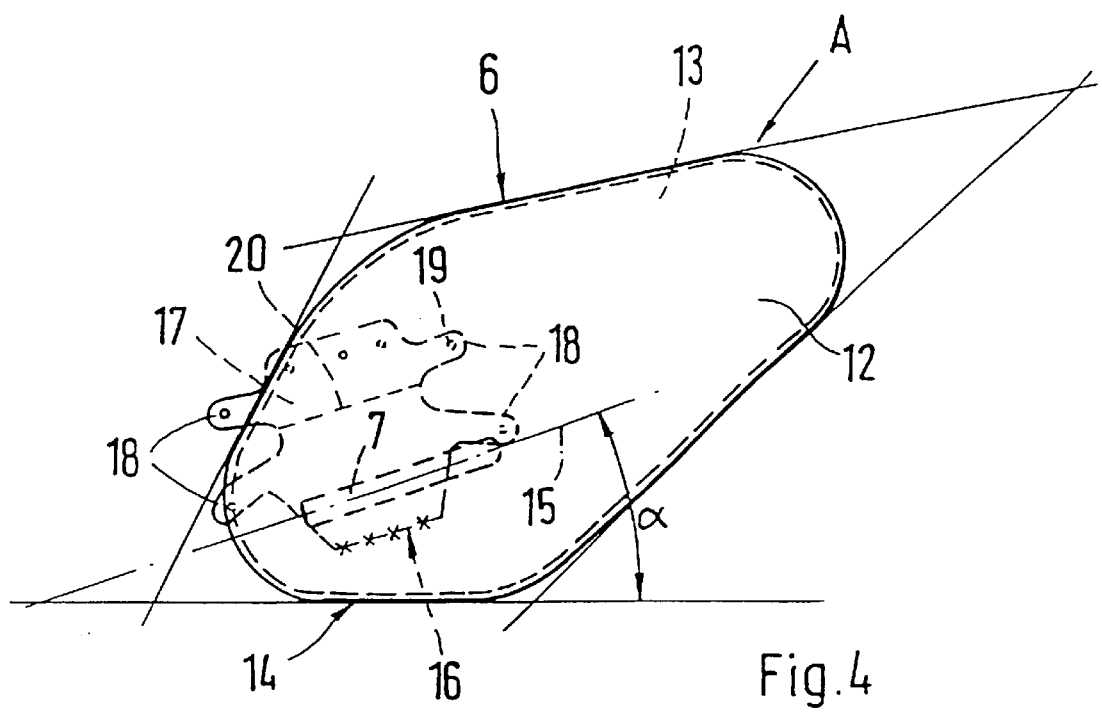
FIG. 4 is a top view of the air bag in the delivery condition.

In the delivery condition A of the air bag 6, the two woven fabric layers 12, 13, which are situated above one another, have approximately the shape of an irregular quadrilateral, adjacent sides of the quadrilateral each being connected with one another by way of rounded transition areas (see FIG. 4). The lower side 14 of the air bag 6 is aligned approximately horizontally. A longitudinal center plane 15 of the tube generator 7 extends at an angle a with respect to the lower side 14. A free end 16 of a protective covering envelope 17 is fastened to the woven fabric layer 13. The protective cover envelope 17 has four protruding holding tabs 18, each holding tab 18 being provided adjacent to its free end with a circular opening 19. The protective cover envelope 17 surrounds the air bag 6 in its folded-together position and has an elongated desired breaking point 20 which tears when the air bag 6 is inflated. FIG. 4 illustrates the delivery condition of the air bag 6 with the installed tube generator 7; the woven fabric layer 12 is situated on top.

Figure 5:
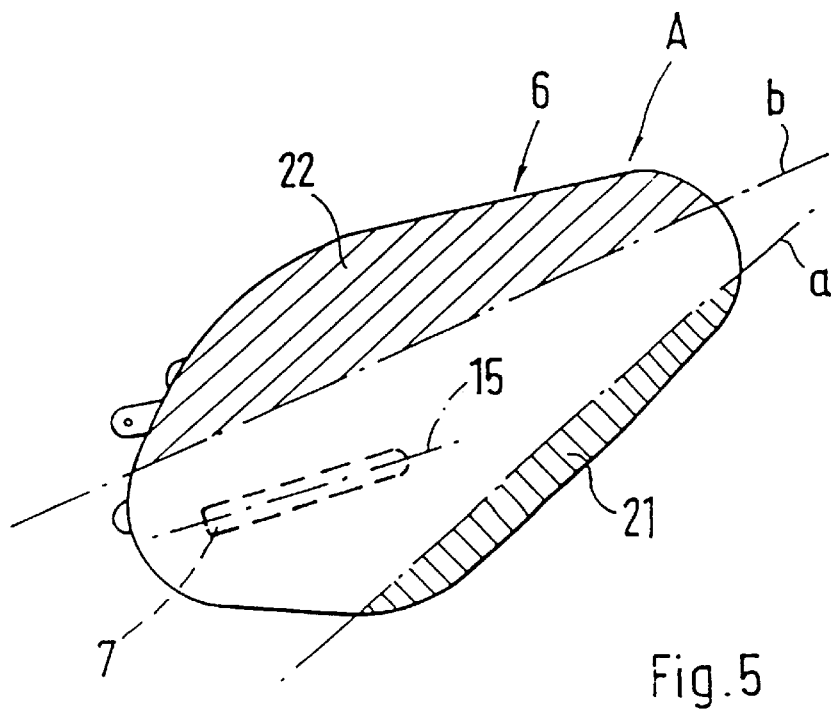
FIG. 5 is a top view corresponding to FIG. 4 and showing the folding lines a and b for the first two turning foldings.
Figure 6:
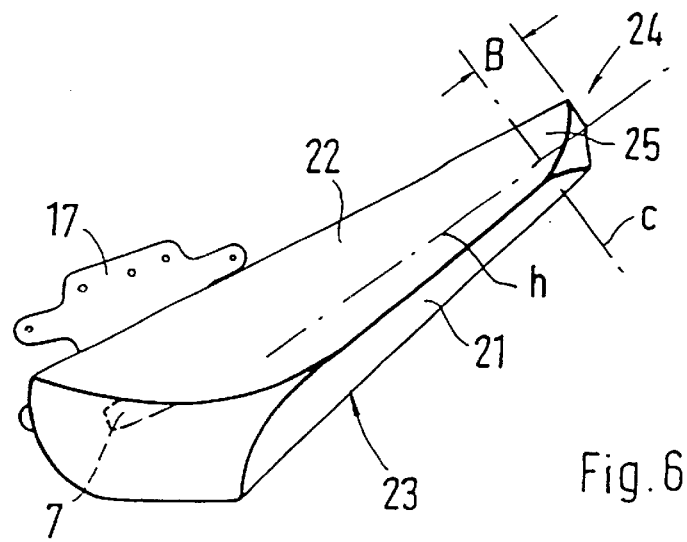
FIG. 6 is a top view of the air bag showing an upper edge area and a lower edge area of the air bag in their turned-in positions within an elongated trapezoidal structure and a folding line c for the narrow end area of the trapezoidal structure.
Figure 7:
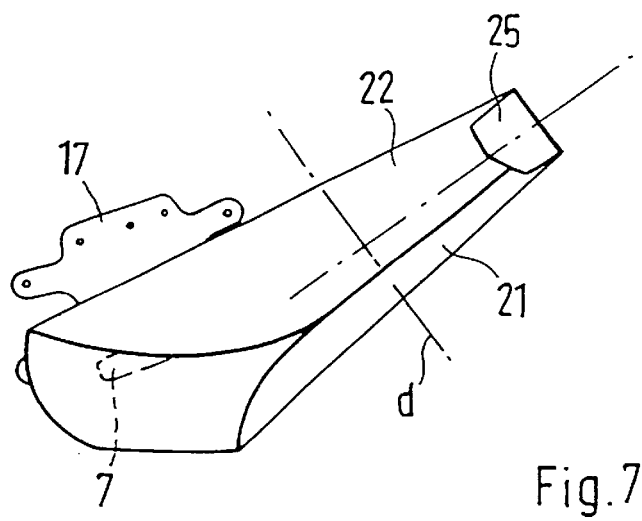
FIG. 7 is a top view corresponding to FIG. 6 showing the narrow end area turned in about the folding line c and a boundary line d.

The folding of the air bag 6 according to the invention by the combined turning and rolling folding takes place at least partially on a folding machine and comprises the following steps. First, a lower edge section 21 of the air bag 6 is folded about a folding line a toward the inside onto the woven fabric layer 12 (see FIG. 5). Then, an upper edge section 22 of the air bag 6 is folded in the same manner about a folding line b toward the inside also onto the woven fabric layer 12 so that a narrow elongated, approximately trapezoidal structure 23 is created (FIG. 6). On the folding machine, which is not shown in detail, the position of the edge sections 21, 22 with respect to one another and the position of the center axis h is controlled which extends perpendicularly to the folding line c. In a further step, the structure 23 is turned over to the inside (extent B) on its narrow end 24 about a folding line c so that the end area 25 comes to rest on the turned-over edge sections 21, 22 (see FIG. 7).

Figure 8:
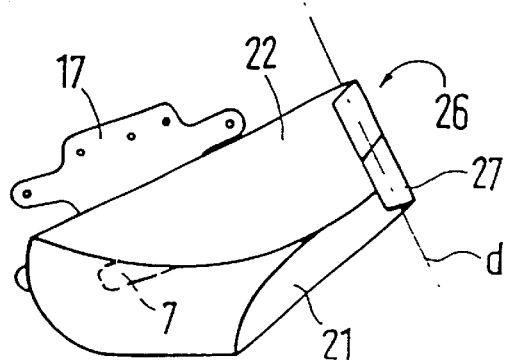
FIG. 8 is a top view of the air bag showing the narrow end area folded together by multiple rolling folds toward the inside to the line d for forming a rolled package.

Then a repeated rolling folding 26 of the narrow end area 25 takes place in the direction of the tube generator 7 until the rolled package 27 comes to rest approximately above a boundary line d (see FIG. 8).

Figure 9:
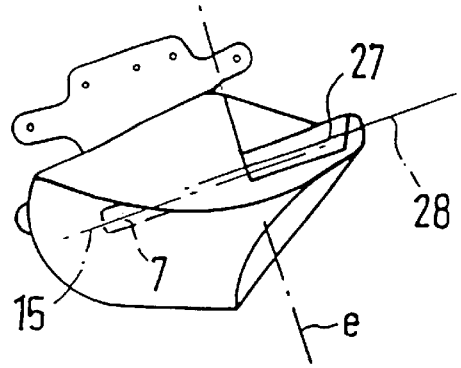
FIG. 9 is a top view of the air bag showing the rolled package, by turning-in, as aligned by approximately 90° toward the inside approximately parallel to the tube generator, but extending offset to it as viewed in the longitudinal direction.

In the next step, the rolled package 27 is moved by a turning-in about approximately 90° toward the inside such that the center axis 28 of the rolled package 27 extends approximately in the same direction as the longitudinal center plane 15 of the tube generator 7. In this position, the turned-in rolled package 27 and the tube generator 7—viewed in the longitudinal direction—adjoin one another while being situated behind one another (FIG. 9).

Figure 10:
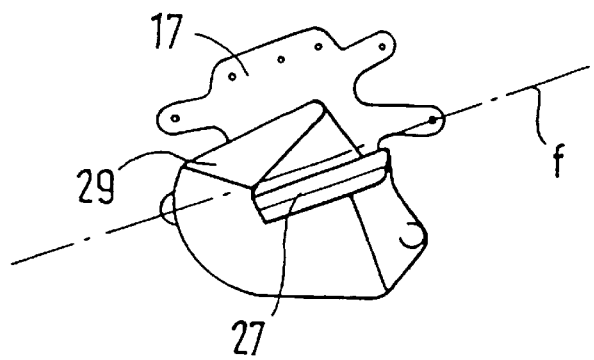
FIG. 10 is a top view of the air bag showing the rolled package as turned about the folding line e approximately by 180° onto the tube generator.
Figure 11:
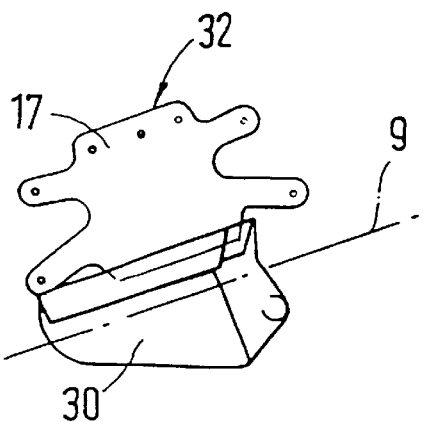
FIG. 11 is a top view of the air bag showing an upper air bag area as turned about a folding line f onto the rolled package.
Figure 12:
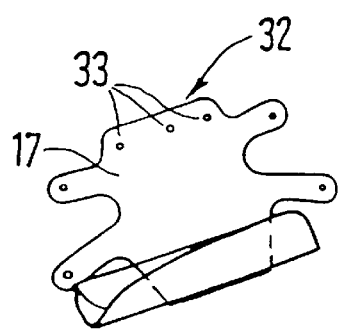
FIG. 12 is a top view showing a lower edge area as turned about a folding line g onto the rolled package.
Figure 13:
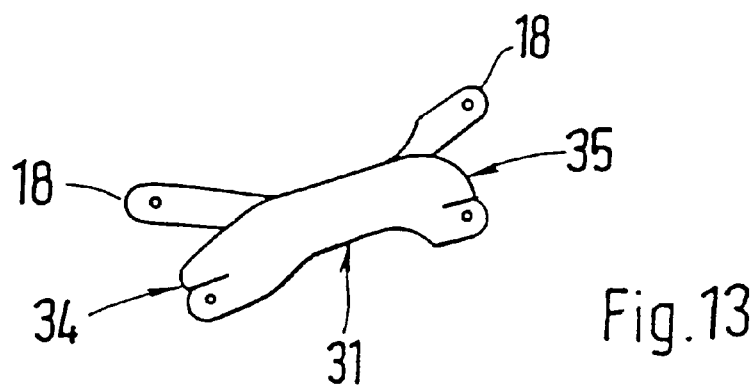
FIG. 13 is a top view of the folded-together air bag showing the protective cover envelope as extending around the folded air bag.

In a further step, the turned-in rolled package 27 is turned over the tube generator (FIG. 10) about a line e extending approximately perpendicularly to the rolled package 27. Then the upper air bag area 29 situated above the longitudinal axis of the rolled package 27 is folded toward the inside about the line f, and then the lower air bag area 30 situated below the longitudinal axis of the rolled package 27 is folded upwards over the turned-in upper part (FIGS. 11 and 12). Now the protective cover envelope 17 is folded around the folded package 31 (FIG. 13) and the free end 32 of the protective cover envelope 17 is suspended on the protruding fastening bolts 9 of the generator support 8. For this purpose, corresponding openings 33 are constructed on the protective cover envelope 17.

Figure 14:
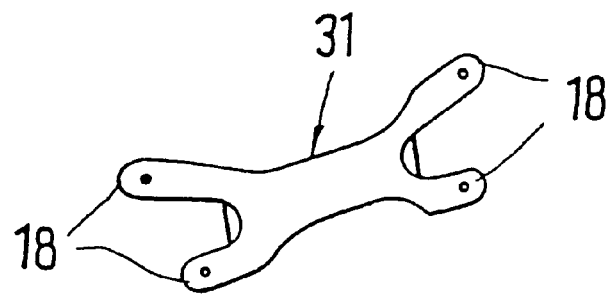
FIG. 14 is a top view of the folded-together air bag showing the lateral ends of the air bag as fitted under the protective cover envelope.
Figure 15:
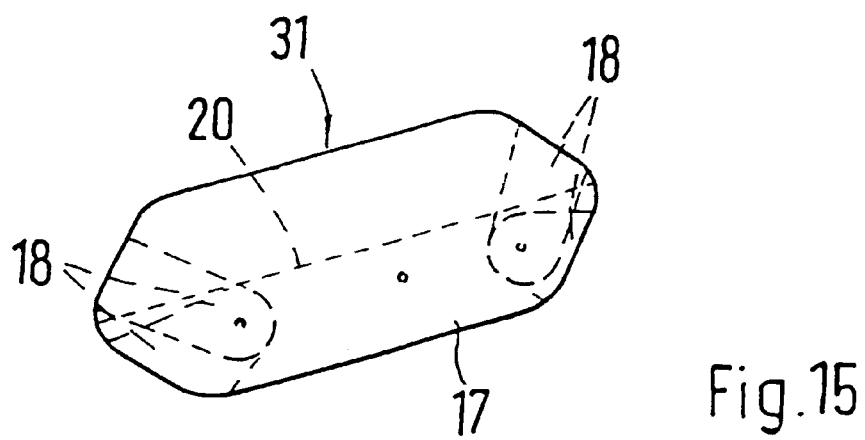
FIG. 15 is a top view of the completely folded-together package provided with the protective cover envelope and in which a the holding tabs of the protective cover envelope are suspended in the fastening bolts of the generator support.

In a last step, the lateral holding tabs 18 of the protective cover envelope 17 are suspended to the inside and also in the protruding fastening bolts 9. Before the suspending of the holding tabs 18, the lateral end areas 34, 35 of the folded package 31 are fitted toward the inside under the protective cover envelope 17 (FIG. 14). The thus folded-together package 31 according to FIG. 15 is inserted into the housing 4 and fixedly connected with it.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Process for folding an air bag of an impact protection system for accommodation in a housing in which an inflating system and the folded air bag are accommodated, the inflating device being formed by an oblong tube generator, comprising:

folding a lower edge section of the air bag inside about a first folding line and folding an upper edge section of the air bag inside about a second folding line so that an elongated, approximately trapezoidal structure is obtained, folding an edge area inside about a third folding line in an area of a narrow end of the trapezoidal structure, rolling the edge area inside repeatedly toward a boundary line while forming a rolled package, turning the rolled package in so that the rolled package extends approximately parallel to a longitudinal axis of the oblong tube generator and is longitudinally offset with respect to the generator, turning the rolled package and an air bag region situated underneath the rolled package by approximately 180° inside about a fourth folding line so that the rolled package becomes situated above the tube generator, folding an upper air bag region inside about a fifth folding line onto the rolled package, folding a lower air bag region inside about a sixth folding line onto the rolled package to form a folded air bag, enveloping the folded air bag with a protective covering envelope fastened to the woven layer and suspending a free end of the protective covering envelope on fastening bolts of a generator carrier, fitting lateral ends of the folded air bag under the protective covering envelope, and suspending lateral holding tabs of the protective covering envelope on the fastening bolts of the generator carrier.

* * * * *